Jan. 20, 1931. R. W. TOMLINSON 1,789,917
ELEVATING AND STACKING APPARATUS
Filed Jan. 10, 1928 9 Sheets-Sheet 3

INVENTOR
R. W. Tomlinson
BY
Munn & Co.
ATTORNEYS

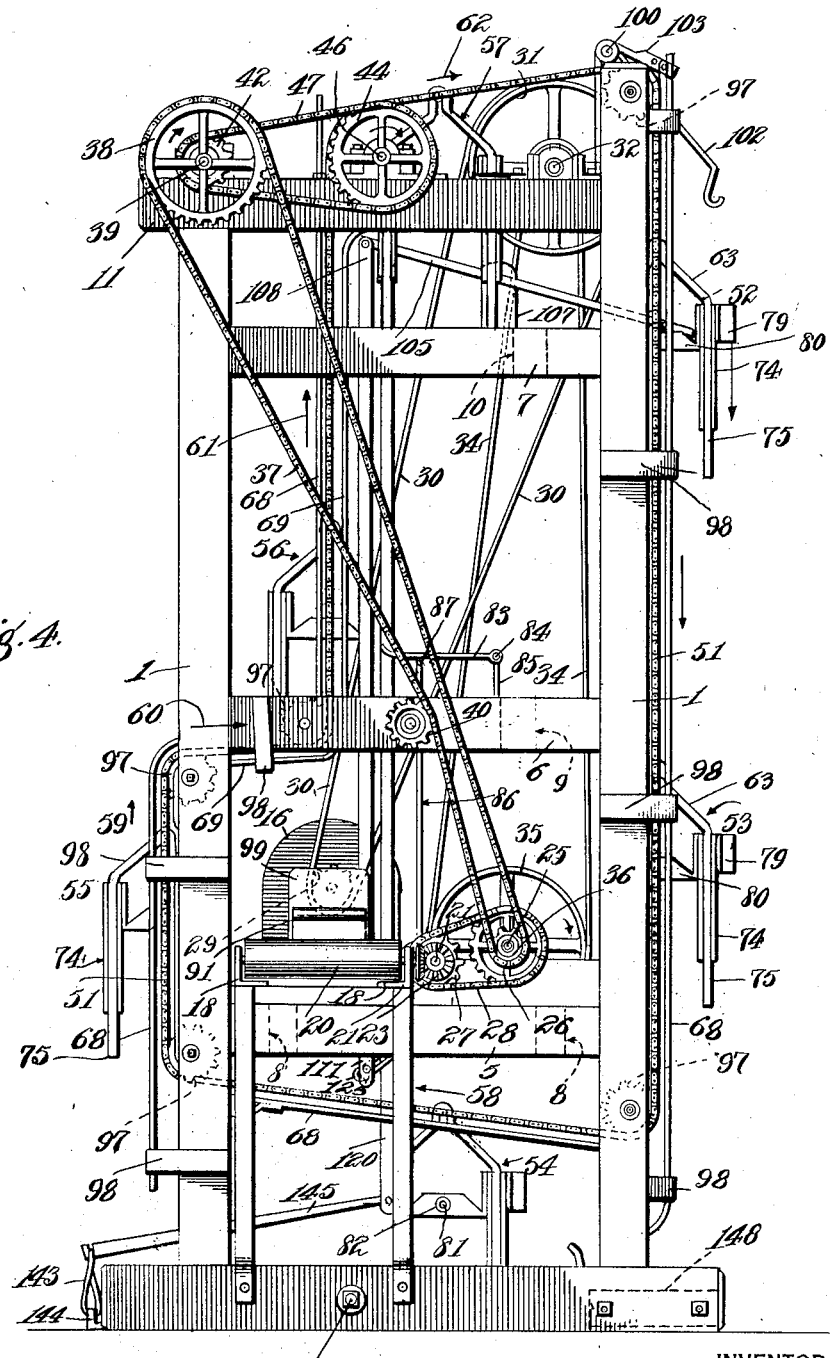

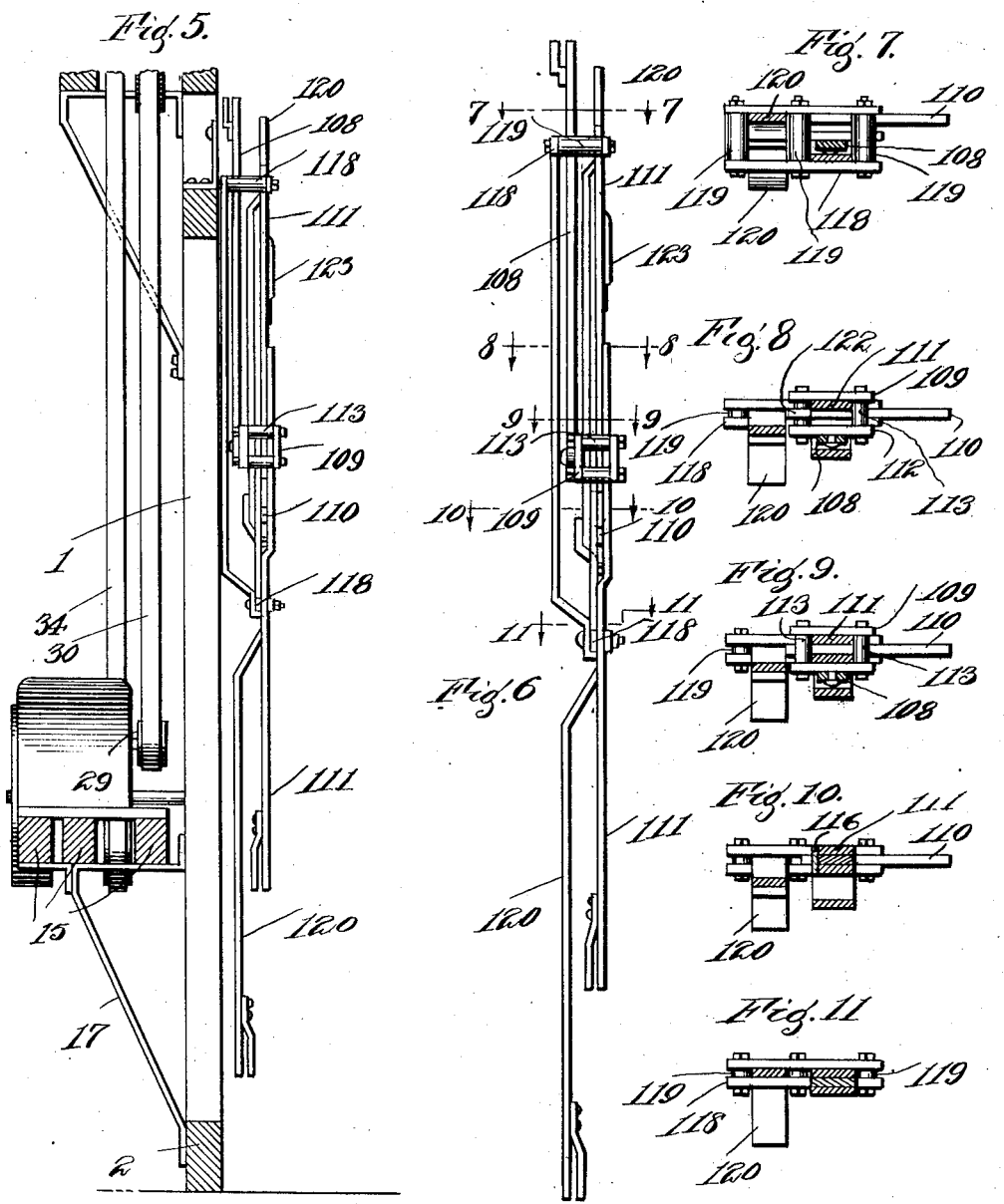

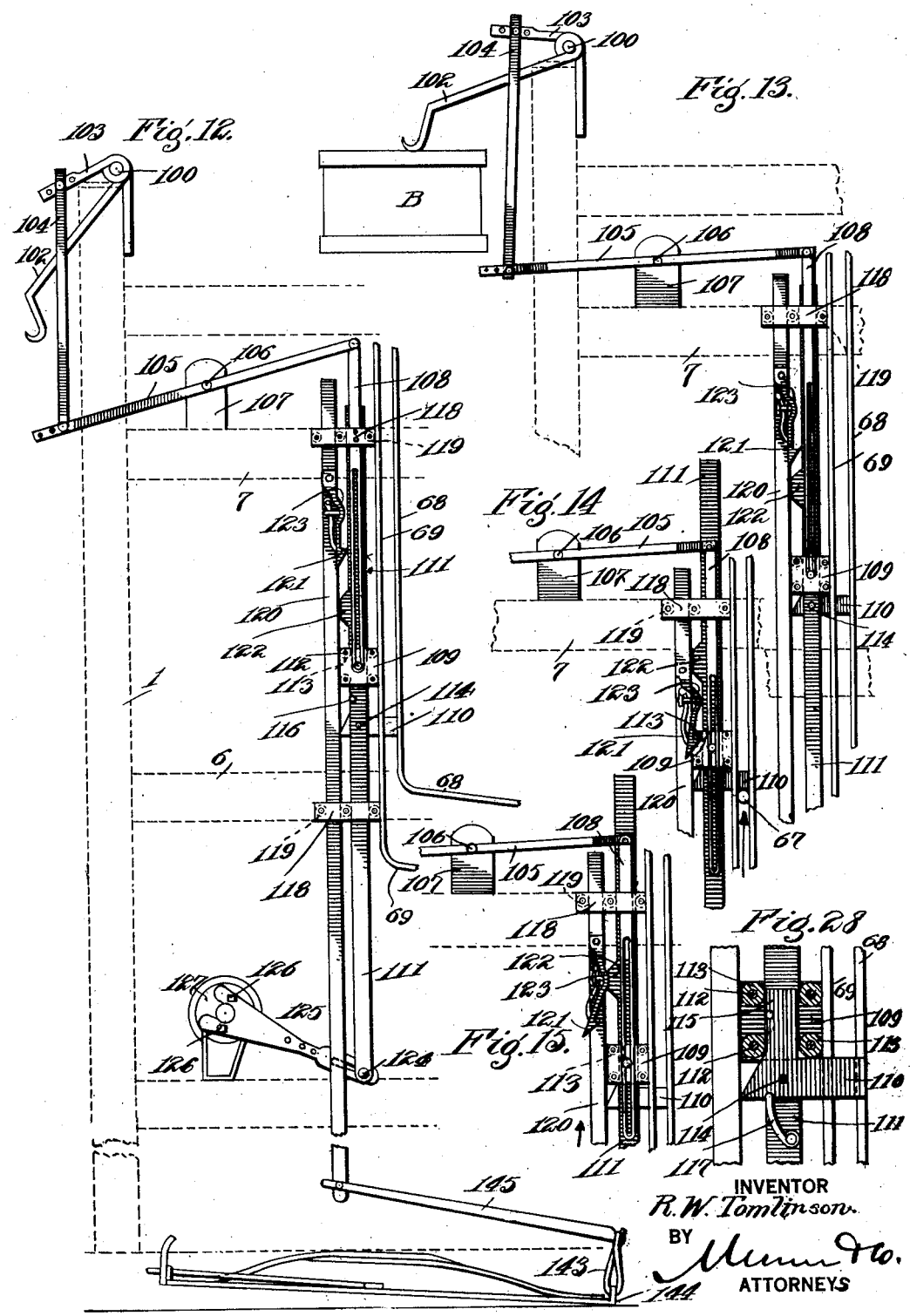

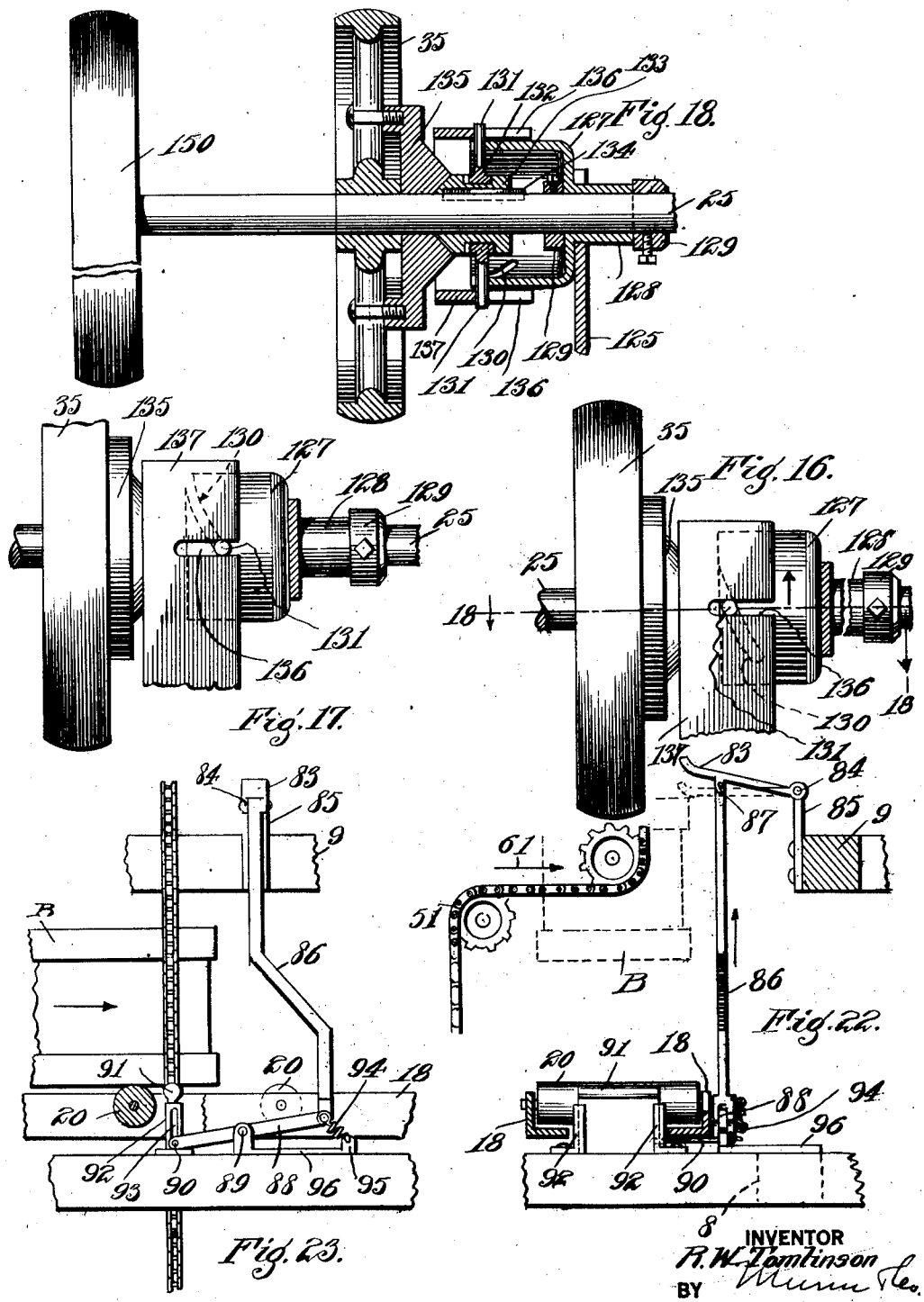

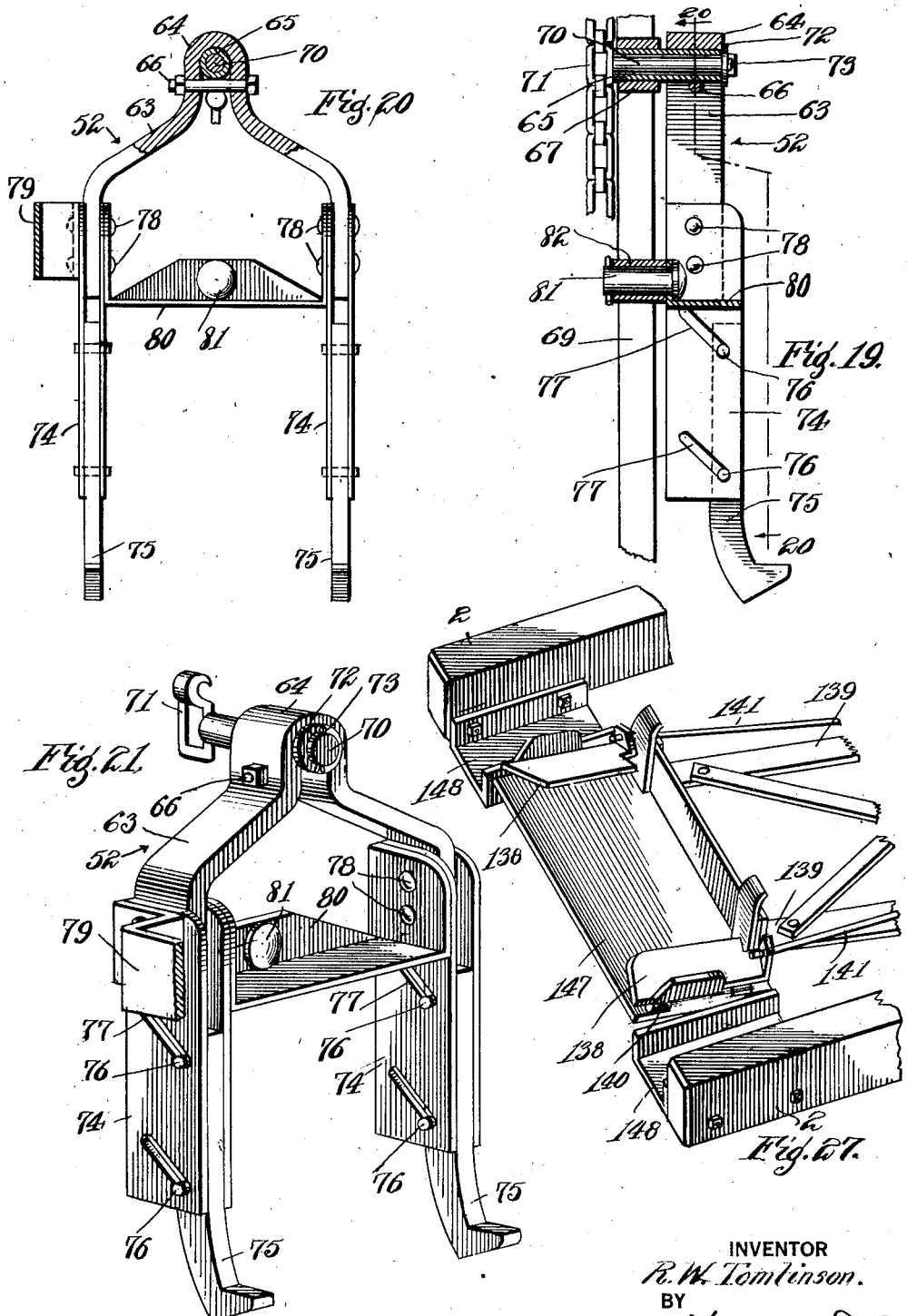

Jan. 20, 1931.   R. W. TOMLINSON   1,789,917
ELEVATING AND STACKING APPARATUS
Filed Jan. 10, 1928   9 Sheets-Sheet 9
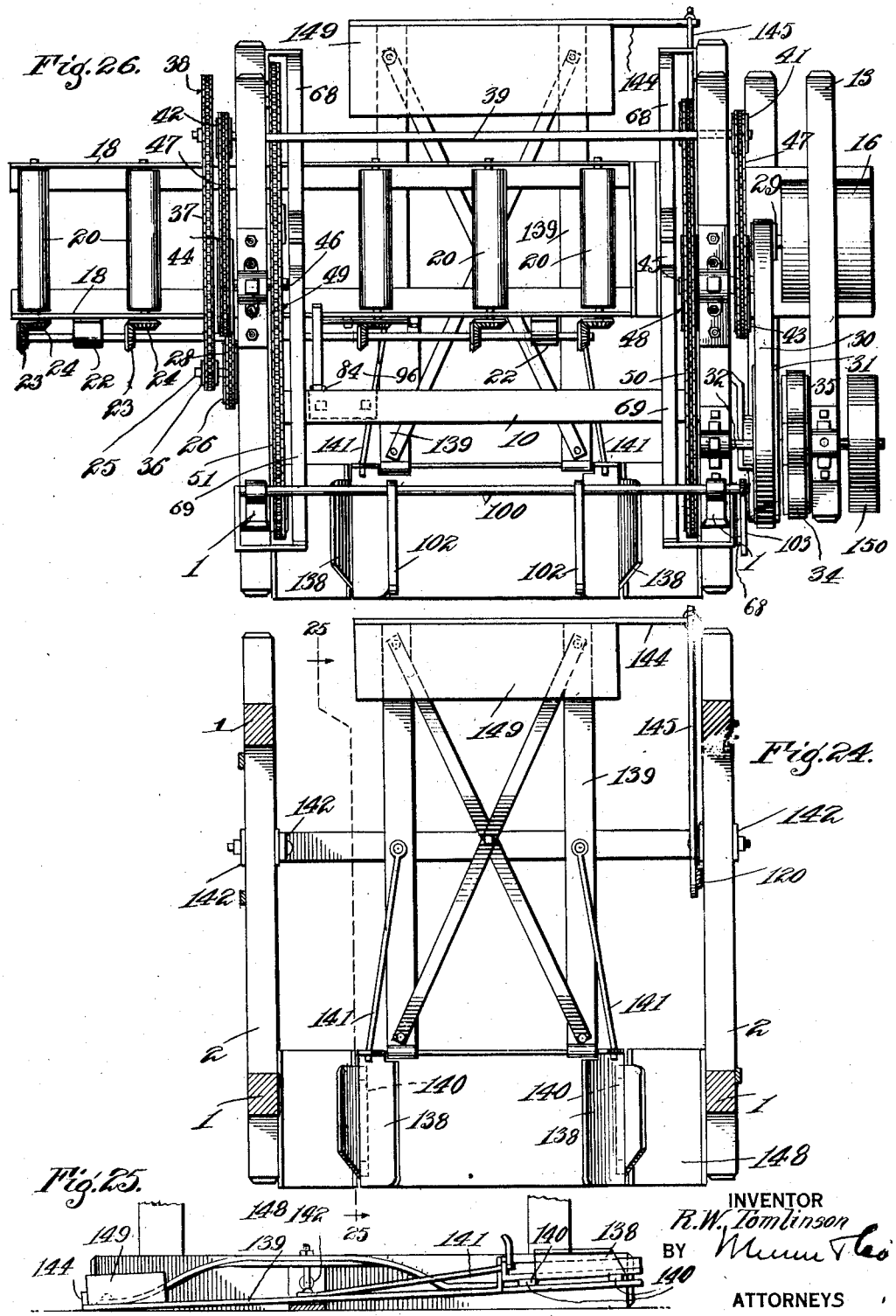

Patented Jan. 20, 1931

1,789,917

UNITED STATES PATENT OFFICE

ROBERT W. TOMLINSON, OF EXETER, CALIFORNIA

ELEVATING AND STACKING APPARATUS

Application filed January 10, 1928. Serial No. 245,725.

This invention relates to improvements in apparatus for stacking boxes, crates or the like, and it consists of the constructions, combinations and arrangements herein described and claimed.

An object of the invention is to provide an apparatus which may be used for conveniently piling boxes, crates, or the like upon each other in order to produce a conveniently high stack that will compose a load capable of readily being picked up by a hand truck and rolled away.

Another object of the invention is to provide an apparatus for receiving and stacking to a convenient height boxes or crates of fruit as delivered from the field so that the stack, when completed, may be picked up by a hand truck and transported to the desired point of disposal.

A further object of the invention is to provide an apparatus for the purpose described, embodying instrumentalities by which the necessary motions are controlled by the boxes as they pass therethrough.

Figure 1:
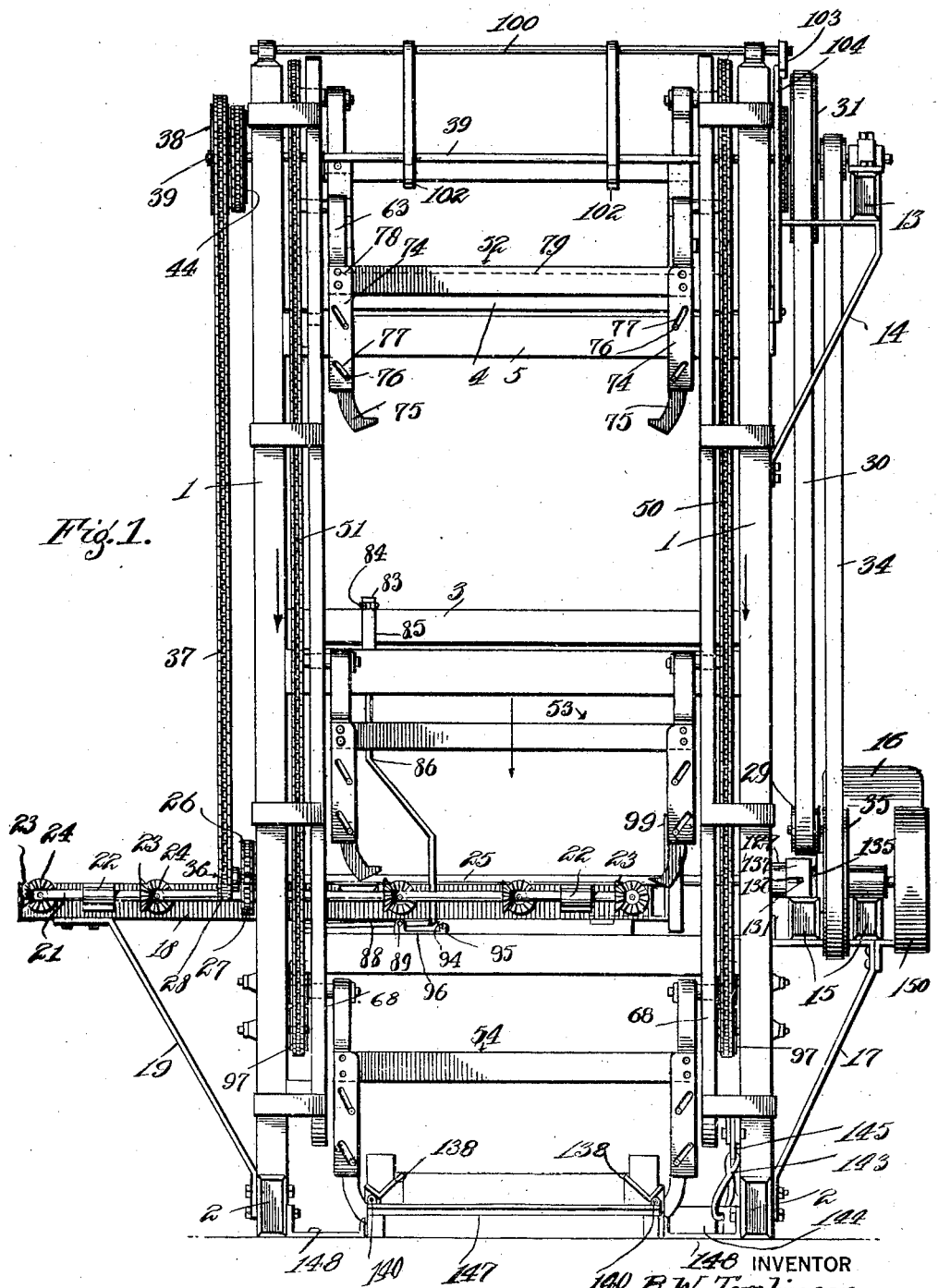
Figure 2:
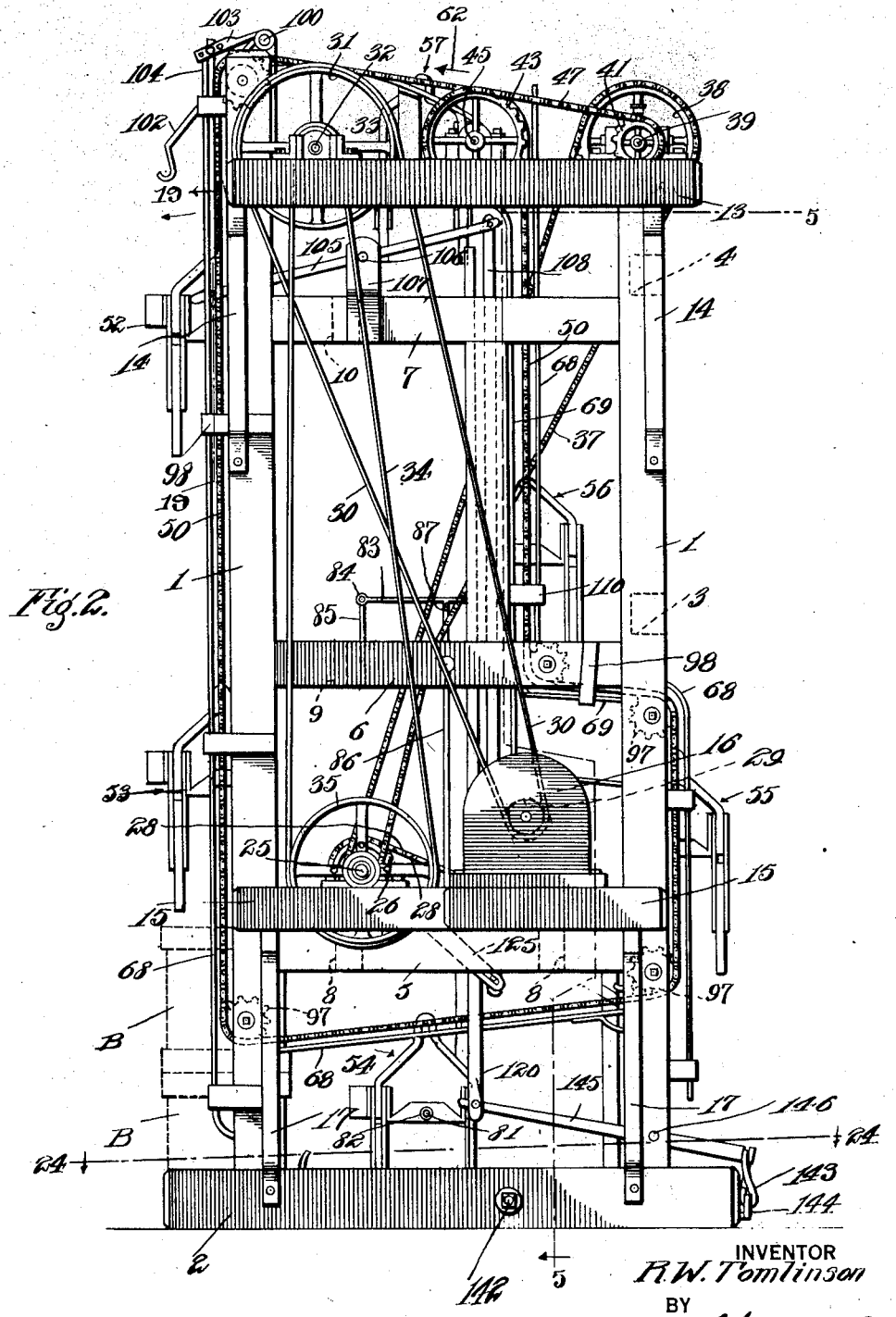
Figure 3:
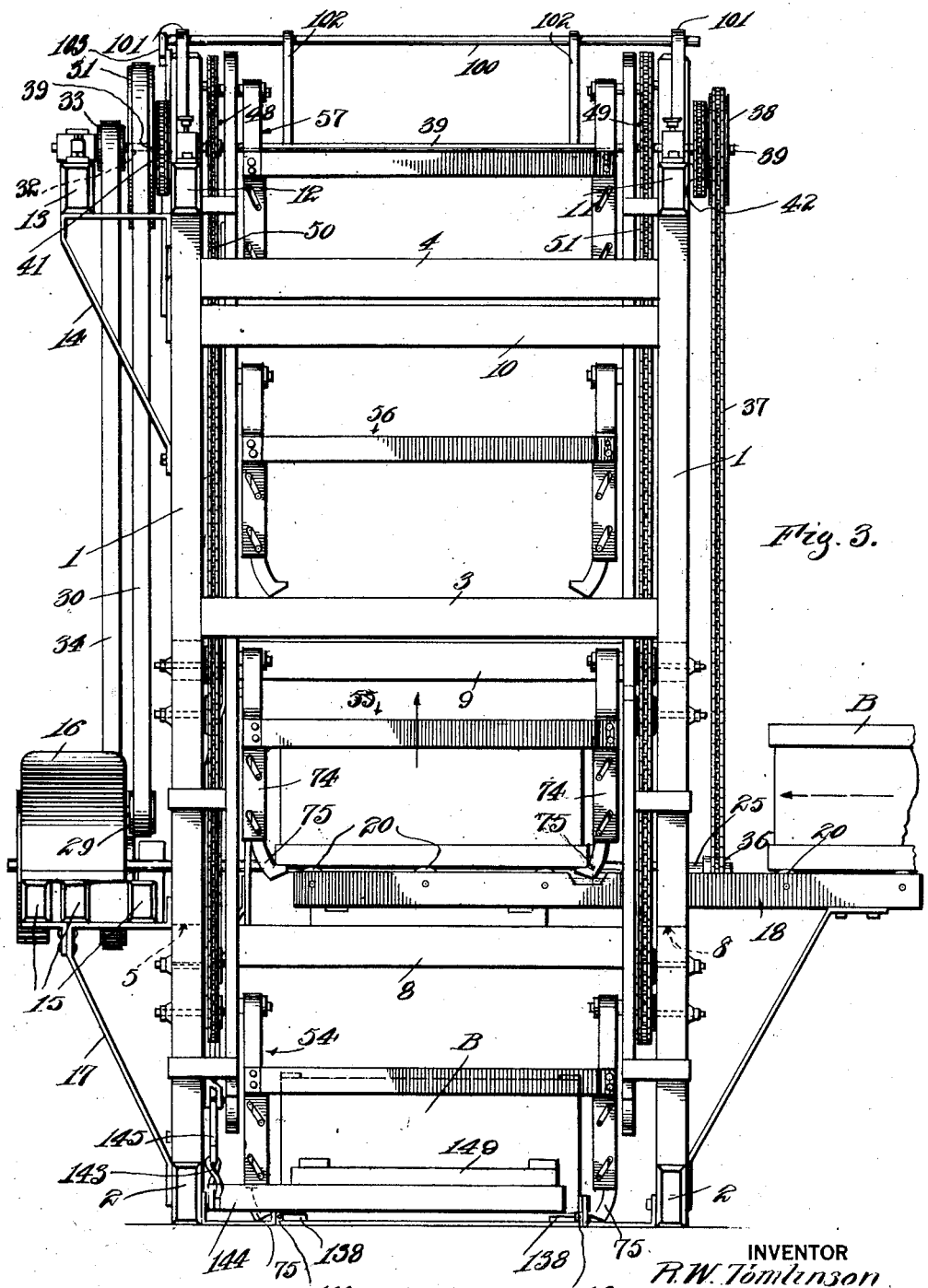

Other objects and advantages appear in the following specification, reference being had to the accompanying drawings in which, Figure 1 is a front elevation of the apparatus, Figure 2 is an elevation of the right side of the appartus, the fly wheel being removed, Figure 3 is an elevation of the rear side of the apparatus, Figure 4 is an elevation of the left side of the apparatus, Figure 5 is a vertical section taken substantially on the line 5—5 of Figure 2, illustrating the general disposition of the starting and stopping mechanism, Figure 6 is a detail and somewhat enlarged view of the same mechanism, Figure 7 is a detail cross section on the line 7—7 of Figure 6, Figure 8 is a detail cross section on the line 8—8 of Figure 6, Figure 9 is a detail cross section on the line 9—9 of Figure 6, Figure 10 is a detail cross section on the line 10—10 of Figure 6, Figure 11 is a detail cross section on the line 11—11 of Figure 6, Figure 12 is a diagrammatic elevation of the starting and stopping mechanism illustrating the position assumed during the formation of the stack, said position agreeing with the showing in Figure 2, Figure 13 is a similar view illustrating the position effected by the placing of the last box upon the stack, Figure 14 is a similar view illustrating the resulting lifting action upon the clutch shift bar, by one of the moving box carriers, said lifting action resulting in the disengagement of the clutch and temporarily stopping of the apparatus, Figure 15 is a similar view illustrating the action upon the mechanism when the completed stack is removed from the apparatus, Figure 16 is a detail side elevation of the clutch mechanism as it appears in engaged position, Figure 17 is a detail side elevation of the clutch mechanism in disengaged position, Figure 18 is a horizontal section taken substantially on the line 18—18 of Figure 16, Figure 19 is a detail vertical section of a portion of one of the box carriers taken substantially on the line 19—19 of Figure 2, Figure 20 is a detail vertical section taken on the line 20—20 of Figure 19, Figure 21 is a fragmentary perspective view of one of the box carriers, particularly illustrating one of the ends, Figure 22 is a diagrammatic elevation of the stop actuating means, Figure 23 is an elevation of the stop mechanism in Figure 22, an adjacent conveyor roller being shown in section, Figure 24 is a horizontal section taken substantially on the line 24—24 of Figure 2, Figure 25 is a longitudinal section taken on the line 25—25 of Figure 24, Figure 26 is a plan view of the apparatus, Figure 27 is a detail perspective view of one end of the floor pedal, Figure 28 is a detail sectional view of the cage and trigger.

As already indicated in the foregoing brief statements of the objects of the invention the outstanding purpose of the apparatus is to facilitate the handling and disposition of filled boxes of fruit or the like as received at the packing house. As the fruit is picked in the field it is deposited in what are termed field boxes or receptacles which are of standard and uniform size. These boxes are delivered to the packing house for certain necessary treatment.

Such treatment comprises grading, sizing, packing, etc., and in order that all available space in the packing house may be utilized to best advantage it is desirable that the field boxes be stacked. The stacking of the boxes makes it easy to handle them, and the boxes will then require less floor space than if they were stood around loose. It is the particular function of the apparatus to receive the boxes and pile one on top of each other until a stack of seven is made.

More or less boxes may be placed in a stack, these limitations being governed by the height of the apparatus only. After being placed in stacks the boxes are readily taken up by hand trucks and transported to points of ultimate deposit.

The apparatus includes an upright frame work and a horizontal conveyor frame. The first comprises corner posts 1 which are suitably secured to parallel floor sills 2. The posts are held in proper relationship by rear longitudinal braces 3 and 4, (Figs. 2 and 3) and cross braces 5, 6 and 7 (Figs. 2 and 4). The latter are connected by counter braces 8, 9 and 10 (Figs. 2 and 4). It is observed that the use and particular disposal of the counter braces 8, 9 and 10 at the left of Figure 2 avoids the necessity of connecting the adjacent corner posts by longitudinal braces similar to 3 and 4. This leaves what might be termed a front space between the corner posts at the left in which the box carriers have free movement.

This space constitutes the place where the box stack is formed, several of the boxes being indicated in dotted lines at B in Figure 2. The box carriers described in detail later, travel downwardly in the space mentioned, the distance traversed constituting the longest component of the various passages along which the carriers move.

Top rails 11 and 12 serve also to connect the corner posts, these, and a similar rail 13, providing the necessary supports for certain bearings. The rail 13 being located outside of the framework (Figs. 1 and 3) is mounted upon suitable brackets 14 which in turn are affixed to the adjacent corner posts 1.

Situated below the rail 13 and on the same side of the apparatus is a series of rails 15 (Figs. 1, 2 and 3). These comprise the supports for the electric motor 16, as well as the clutch mechanism mentioned later. They are suitably assembled upon brackets 17, which like the brackets 14 are secured to the framework.

The second of the frames mentioned, this being the conveyor frame, comprises horizontal and parallel angle sills 18. These are appropriately mounted upon upright framework, the left protruding extremity (Fig. 1) being supported by brackets 19 also secured to the framework. Rollers 20 are journalled upon the angle sills in positions running crosswise of the apparatus. It is upon the rollers in the left protruding end of the horizontal conveyor frame that the boxes are delivered prior to passage through the apparatus (Fig. 3.)

It is the function of the conveyor frame to conduct the boxes into the apparatus and into position to be taken up by the box carriers. For the first purpose the rollers are continuously driven by a common shaft 21 (Fig. 1) which is suitably journalled at 22 on the side of the adjacent angle sill. The shaft has beveled gears 23 meshing with similar gears 24 on the ends of the roller shafts (protruding) through the adjacent sill mentioned. Driving power for the shaft 21 is derived from the motor 16 for which purpose the latter is made to drive the lower counter-shaft 25. The countershaft carries a sprocket 26 to which and a sprocket 27 on the shaft 21 a chain 28 is applied.

The foregoing driving of the countershaft 25 is accomplished as follows: The motor shaft carries a pulley 29 to which a belt 30 is applied. This belt runs over a large pulley 31 on the primary upper countershaft 32. This shaft carries a small pulley 33 to which a belt 34 is applied, the latter driving the pulley 35 of the lower counter shaft 25 mentioned before.

A sprocket 36 on the extremity of the lower countershaft 25 drives a chain 37 which is applied to a large sprocket 38 on a second upper countershaft 39. This countershaft extends from side to side of the apparatus (Fig. 3).

Small sprockets 41 and 42 at the ends of the shaft 39 (Figs. 3 and 4) drive larger sprockets 43 and 44 upon carrier drive shafts 45 and 46 by means of applied chains 47. The sprockets 43 and 44 are situated on the outside of the framework, similar sprockets 48 and 49, mounted on the inner ends of the shafts 45 and 46 and being located on the inside of the framework, being the means by which the chain carrier belts 50 and 51 are driven. For the latter purpose the belts are applied to the sprockets 48 and 49 as shown in Figs. 3 and 26.

In order that the reader may appropriately associate the various positions of the apparatus in Figs. 1 to 4, as well as possess a clear understanding of the motions of the horizontal conveyor and the chain carrier belts it is thought wise to digress from the description of the construction at this time to briefly deal with these points. Facing the apparatus in Fig. 1 the observer will see the boxes move along the horizontal conveyor to the right in order to assume positions inside of the framework. The chain carrier belts 50 and 51 will be seen travelling downwardly and depositing the boxes in front of the observer at the front of the apparatus. Agreeable with the last statement the chain carrier belts will be seen moving clockwise when the apparatus is observed from the left side in Fig. 4. In Fig. 3 the box carriers about to be described, will be seen appearing at the bottom of the apparatus and travelling upward only part of the way when they pick up the waiting box on the horizontal conveyor in readiness to carry such box upwardly prior to depositing it in the stack.

Six box carriers, respectively denominated 52, 53, 54, 55, 56 and 57 are swingably mounted upon the companion chain carrier belts 50, 51 (Fig. 4). These carriers traverse paths or passages of different lengths, the longest component, as mentioned before, being at the front of the apparatus where the stack is formed. The other components designated in the order in which they are reached, comprise the lower cross path 58, short vertical path 59, short horizontal take-off path 60, vertical path 61 and remaining or connecting cross path 62. Inasmuch as each of the carriers is identical in construction the description of the carrier 52 will suffice for all.

End arms 63 are of substantially inverted U-shape (Figs. 20 and 21). Each bent extremity 64 of these arms receives a sleeve 65 (Fig. 19) that protrudes in the outward direction. Each sleeve is clamped in position by a bolt 66 passing through from side to side of the extremity. The outer extremity of the sleeve provides the bearing for a roller 67 which is engageable with appropriately located guides 68 and 69. The sleeve also receives a gudgeon 70 protruding inwardly from a special link 71 in the adjacent carrier chain. The inner end of the gudgeon receives a washer 72 and securing pin 73.

Housings 74 receive the shanks of hooks 75 upon which the box rests when caught by the carrier at the take-off position 60.

The shaft of each hook carriers studs 76 (Fig. 9) that ride in upwardly and outwardly angled slots 77 in the companion housing 74. These slots permit the hooks to ride into separated or disengaging positions for the purpose of releasing and depositing the box in the stacking position.

Rivets 78, or the equivalent thereof, secure the housings 74 upon the adjoining arms. The same rivets also serve to secure a strap 79 and guide bracket 80. The strap serves to connect the end arms 63 so that they may not swing independently, and also serves to fix the position of the box upon the carrier. The bracket 80 carries a stud 81 (Fig. 19) upon which a roller 82 is journalled. This roller rides between the guides 68 and 69 thus keeping the carrier in the desired vertical position while traversing the various vertical paths.

Movement of the boxes along the horizontal conveyor into the take-off position within the apparatus is regulated by a stop, the depressing movement of which is effective by one of the boxes while traversing the vertical path 61. A trip 83 (Figs. 4, 22 and 23) ordinarily assumes a position (full lines Fig. 4, dotted lines, Fig. 22) whereat it will be engaged and displaced by an upwardly moving box.

For the latter purpose the trip is pivoted at 84 upon a bracket 85 carried by the counter brace 9. A lift rod 86, pivoted to the trip at 87 is pivotally connected to one end of a stop lever 88 (Fig. 23). The stop lever rocks upon a fulcrum 89. The remaining free extremity connects with the stud 90 projecting from the adjacent edge of the movable stop 91.

Cleats 92 receive the edges and guide the stop 91. The cleat at the edge where the stud 90 occurs has a slot 93 (Fig. 23) through which the stud extends.

At certain periods the stop 91 assumes an upwardly projected position between adjacent rollers 20 of the horizontal conveyor (Fig. 4). This position may be ensured by the attachment of a spring 94 to the lift rod 86 at an appropriate place. Figure 23 shows the spring to be attached between the pivotal point of the lift rod and stop lever and a lug 95 upon the base plate 96 upon which the lever is fulcrumed. Assuming a box to have reached the trip 83 it is readily seen that continued upward movement will displace the trip to the full line position in Figure 22, thus lifting the rod 86 rocking the lever 88 and depressing stop 91 so that another box may move into the take-off position upon the roller conveyor where it comes into resting position against a fixed stop 99 (Fig. 1).

Reverting briefly to the construction of the chain carrier belts 50 and 51 it is observed in Figs. 2 and 4 that these run over a system of idler sprockets 97 appropriately so located as to cause the movement of the belts in the appropriate directions. These sprockets are suitably journalled upon the framework. The guides 68 and 69 are fixedly mounted to the framework by brackets 98.

The foregoing action of the movable stop mechanism is repeated until the stack at the left of Fig. 2 contains the desired number of boxes which, in this instance, will comprise seven. The operation of the apparatus must temporarily stop when the foregoing stack is completed, and when the stack is removed in the manner already suggested the apparatus must again be made to start. The starting and stopping are accomplished by mechanism clearly shown in Figs. 2, and 12 to 18 inclusive which mechanism is under control of the boxes.

A rock rod 100 journalled at 101 at the top of the framework (Figs. 1 to 4) carries lever arms 102 which are displaced in the outward direction by each box during passage from the upper path 62 to the last vertical component of movement. Also secured to the rock rod is a lift arm 103 to which one end of a rod 104 is connected. The other end of the rod is connected with a rocker 105, fulcrumed at 106 on a frame 107 carried by a cross brace 7, the opposite end of the rocker having the cage link 108 pivotally connected therewith. This link supports a cage 109 in such position above a trigger 110 that rocking motion of the latter is not impeded during the stacking of seven boxes. The cage 109 includes a pair of plates (Fig. 9) disposed outside of the clutch shift bar 111, these plates being connected by studs 112 upon which rollers 113 are mounted. These rollers ride upon the edges of the bar 111.

A pin 114 provides the fulcrum for the trigger 110 upon the shift bar 111. The heel 115 of the trigger carries the stop pin 116 engaging the adjacent edge of the bar 111 by virtue of the action of a leaf spring 117.

Normally the trigger 110 stands in position across the roller passageway afforded by the guides 68 and 69. One of the rollers 67 of each box carrier will trip the trigger in passing by, but lowering of the cage 109 over the heel 115, as when the lever arms 102 are held in the raised and extended position by the seventh box (Fig. 13) will prevent such tripping and result in bodily raising the clutch shift bar 111 and its carried parts.

Displacement of the lever arms 102 occurs with the passage of each box thereunder. The resulting action is accompanied by a lowering of the cage 109 and a temporary surrounding of the heel 115, but as soon as the box passes by the lever arms 102 again gravitate to the original position causing raising of the cage 109 and freeing of the heel so that the next box carrier may pass the trigger. Further guidance of the clutch shift bar 111 is afforded by brackets 118 in which rollers 119 provide anti-friction bearing not only for the bar 111, but for a holding bar 120 as well.

Assuming the seventh box to have been deposited on the stack and the lever arms 102 to have been raised to the position shown in Figure 13 it will be perceived at once that the cage 109 will assume a lowered position over the heel 115 of the trigger so that the latter may not be rocked upon the fulcrum pin 114. The nearest box carrier travelling toward the trigger will engage the latter with one of the carried rollers 67 lifting the bar 111 and shifting the clutch (Figs. 16, 17 and 18) so as to stop the chain carrier belts 50, 51. This lifting of the bar brings the nearest uppermost roller 113 of the cage 109 into engagement with a spring hook 121 upon the holding bar 120 where the cage is held in suspended position (Fig. 14). A lug 122 on the bar 111 now assumes the position above the hook 121. The hook has a shoulder 123 which is later engageable by the lug for the displacement of the hook and release of the cage 109.

Lifting of the bar 111 causes the shifting of the clutch so that the chain belts are temporarily stopped. For the former purpose the bar 111 has pivotal connection at 124 with the clutch lever 125. The forked end of this lever is secured at 126 to the shoulder of a cam sleeve 127, the reduced hub 128 of which is freely revoluble upon the lower countershaft 25. The sleeve is held in position by a pair of collars 129. It has cam slots 130 through which the studs 131 of a ring 132 extend. The ring is carried in a groove in the movable clutch element 133. This element is slidable in respect to the countershaft 25 upon which it is held from rotation by a spline 134.

The driven pulley 35 carries a clutch hub 135 with which the element 133 is engageable for the driving of the pulley. The latter is loose on the shaft, but in practice, will be held in proper position by any suitable means. The extremities of the studs 131 occupy slots 136 in a fixed standard 137. Turning of the sleeve 127, as by raising the clutch bar 111, will advance the cam slots 130 over the studs 131 so that the latter are moved outwardly in respect to the slots 136 in the standard 137. The clutch element 133 is carried with the ring 132, and the resulting disengagement of the clutch hub 135 causes stopping of the countershaft 25 and consequent stopping of the chain belts 50, 51.

As the first box B of the stack is deposited to form the bottom of the stack at the front of the apparatus (left side of Fig. 2) such box comes into engagement with a pair of receivers 138, the function of which is to center the box upon a frame 139 herein known as the pedal. These receivers are hinged at 140, being held in an outwardly angled position by spring rods 141. The placing of the box upon the receivers causes the latter to rock upon their hinges and exercise the desired centering effect upon the box. At the same time the pedal will rock upon its fulcrum 142 so that the front end becomes depressed and the rear end elevated.

A link 143 joins the rear connecting brace 144 of the pedal with the adjacent end of a rocker bar 145 which is fulcrumed at 146 upon the framework. The inner end of the rocker bar is pivotally connected to the lower end of the holding bar 120, the effect of placing the aforementioned box upon the receivers 138 being to ultimately rock the bar 145 and slightly lower the holding bar 120 bringing the spring hook 121 somewhat closer to the cage 109 than shown in Fig. 12.

Situated at the lateral extremities of the pedal tray 147 are floor plates or metal runways 148. These serve two purposes: First they are engageable by the extremities of the hooks 75 of the box carriers, and second, serve as runways for the wheels of the hand truck when the latter is run in position to remove the completed stack. Upon engagement of the plates 148 by the extremities of the hooks 75 the latter are caused to temporarily stop. Inasmuch as the remaining portion of the box carrier is impelled downwardly by the motor driven chain belts it follows that action of the angled slots 77 upon the studs 76 will be to displace the studs and box laterally so that the hooks move from under the box. A weight 149 serves the purpose of depressing the rear end of the pedal when the stack of boxes is removed as later explained.

Incidentally features of construction include a fly or balance wheel 150 (Fig. 1) on the right extremity of the lower countershaft 25. Brief reference is made to the starting and stopping mechanism: In Fig. 6 and Figs. 12 to 15 inclusive the clutch shift bar 111 is shown enlarged at 151 to provide a passageway for the housing of the trigger 110. The lug 122 is fitted in the passageway also where it is suitably secured in practice.

The operation may be readily understood. The operation of the motor 16 may be regarded as being continuous. The rate of revolution of the drive pulley 29 is about 1800 R. P. M. This rate is reduced considerably by the system of pulleys and belts illustrated in Fig. 2 from which it is seen that the ultimate drive of the system is at the lower countershaft 25 to which driving power is applied by means of the pulley 35.

As long as the movable clutch element 133 (Fig. 18) is permitted to remain in engagement with the clutch hub 135 of the pulley 35 the foregoing driving power remains applied to the countershaft 25. But as soon as the clutch element 133 is moved away from the hub the pulley 35 is permitted to run idle upon the countershaft, no driving power being applied even though the motor 16 remains in operation as already stated. The clutch shift bar 111 tends to gravitate to a lowered position and when in such position turns the clutch lever 125 wherein the clutch element 133 is moved into engagement with the hub 135 by virtue of the action of the slots 130 upon the studs 131 (Figs. 16, 17 and 18).

The rollers 20 of the horizontal box conveyor are thus in rotation inasmuch as the driving power of the now active countershaft 25 is transmitted to the common drive shaft 21 of the roller conveyor by way of sprockets 26 and 27 (Fig. 1) and connecting chain 28. Up to this time the stop 91 (Fig. 4) is in the raised position above the roller conveyor. As long as the stop remains in this position boxes on the left end of the conveyor are prevented from entering the apparatus.

It is now necessary for the attendant to remove the stop and this he does by manually lifting the trip 83 (Figs. 22 and 23). The resulting lifting of the rod 86 rocks the stop lever 88 so that the stop 91 is depressed below the level of the roller tops permitting the inward travelling of one box until the latter comes to rest against the fixed stop 99.

Assume the box carrier 55 (Figs. 2 and 3) as being the first that comes along. The pendent hooks 75 pass under the waiting box while the carrier traverses the short takeoff path 60, the hooks being lifted when the box carrier begins moving along the adjacent vertical path 61. It is to be observed that there is sufficient distance between the confronting housings 74 (Fig. 19) to permit the box carrier to pass into position between the movable and fixed stops 91 and 99. The rollers 20 are also appropriately disposed so that the hooks will encounter no interference. Portions of the angle sills 18 are cut away (Figs. 1 and 3) to permit passage of the adjacent hooks.

Raising of the stop 91 occurred immediately after the foregoing box took its final position upon the roller conveyor thus preventing the following box from striking against the first. As soon as the first box, now in the act of being elevated along the path 61, (Figs. 4 and 22) comes into engagement with the trip 83 the latter becomes displaced to the full line position (Fig. 22) resulting in the same depression of the movable stop 91 that was originally accomplished by hand. The following box is now admitted to the apparatus, and the foregoing actions will be repeated.

The first box in time will traverse the upper path 62 (Figs. 2 and 4), and as it moves into the final vertical path or stacking space it causes a momentary outward displacement of the lever arms 102. This displacement, although resulting in a momentary lowering of the cage 109 over the heel 115 of the trigger 110 (Fig. 14) has no permanent effect upon the trigger, and although repeated with each of the six boxes will not become permanent until the last or seventh box comes into position on top of the stack.

This last box will hold the lever arms 102 in the displaced position (Fig. 13) until the stack is removed. The consequence of holding of the lever arm in said position is the retention of the cage 109 over the heel 115 of the trigger 110. The nearest roller 67 of the box carrier closest to the trigger instead of merely tripping the trigger and passing by, will now cause a bodily raising of the shift bar 111 so that the clutch lever 125 is raised and the cam sleeve 127 turned in the direction indicated by the arrow in Fig. 16. The same raising of the bar 111 elevates the cage 109 so that the nearest roller 113 engages upon the hook 121 thus holding the bar 111 suspended. The resulting effect upon the studs 131 is to shift the clutch 133 toward the right (Fig. 18) and to release the clutch hub 135 so that the pulley 35 runs free from the countershaft and driving power is denied the latter. The apparatus thus comes to rest until the stack of boxes is removed.

The deposit of the first box at the bottom of the stack was accompanied by a rocking of the pedal 139 (Figs. 24 and 25) upon the fulcrum 142 inasmuch as the box, was placed in the receivers 138 at the front end of the pedal. These receivers it will be recalled, are hinged at 140 so that they may rock as the weight of the box is imposed thereupon, and center the box upon the pedal. The rocking of the pedal elevates the rear end, and inasmuch as the rocker bar 145 is connected by means of the link 143 it follows that the holding bar 120 will be lowered thus bringing the hook 121 (Fig. 12) somewhat closer to the cage 109.

In removing the stack of boxes by means of a hand truck the wheels of the latter are run upon the floor plates 148. As soon as the stack is removed the following reverse rocking of the pedal 139 (lowering of the rear end by means of the weight 149) causes a raising of the holding bar 120 by virtue of the action of the rocker bar 145. As the holding bar moves upwardly the hook 121 raises the cage 109 with it until the latter becomes disengaged from the trigger heel 115. As the holding bar 120 continues moving upwardly, the shoulder 123 of the hook 121 comes into engagement with the lug 122 (Figs. 14 and 15) causing disengagement of the hook from the roller 113 of the cage. The cage having been raised beyond the heel 115 permits the free turning of the trigger 110 so that the shift bar 111 drops. The resulting counter rotation of the clutch lever 125 causes reengagement of the clutch element 133 with the hub 135 (Fig. 18) so that the apparatus is again set in motion.

Respecting the foregoing turning of the trigger 110 it will be recalled that the shift bar 111 was raised by the nearest roller 67 of an adjacent box carrier. Inasmuch as this roller up to this time was in engagement with the trigger 110 it follows that the release of the heel 115 by the cage 109 and the gravitation of the bar 111 permits turning of the trigger which was not possible before. The weight of the shift bar 111 as well as that of the clutch lever 125 causes gravitation of the shift bar, the trigger 110 merely riding over the roller 67 in its downward movement.

The foregoing setting in motion of the apparatus means the starting of the chain carrier belts 50, 51 as well as the suspended box carriers. The nearest box coming into engagement with the trip 83, (Fig. 22) displaces that trip and causes lowering of the stop 91 so that the operation previously described in that respect is repeated. It is thus easily understood that after the apparatus is once started and the motor 16 is permitted to remain in motion, the various acts contributing toward the stacking of the boxes in the space at the front of the apparatus are performed automatically. The apparatus stops temporarily when the requisite number of boxes are piled in the stack and starts of its own accord when the stack is removed.

Reverting briefly to the function of the box carriers it will be recalled that the engagement of the hooks 75 with the floor plates 148 caused a temporary stopping of the hooks. The rest of the carrier progressing downwardly causes a riding outwardly of the studs 76 in the slots 77 with the consequent disengagement of the hooks from the box. The same act occurs in depositing subsequent boxes. The hooks will engage the cleats or edges of a box already in resting position whereupon the downwardly progressing box carrier causes a lateral disengagement of the hooks and release thereof from the box.

I claim:—

1. Apparatus of the character described comprising carrier means for depositing articles upon each other to form a stack, a pedal upon which the stack is formed and which is moved in one direction by the weight of the stack, means causing reaction of the pedal when devoid of a stack, means for driving the carrier means during the formation of the stack said means including a clutch, means actuated by the deposit of the last article upon the stack to move the clutch in one direction and thus stop the carrier means, and means operated by the reaction of the pedal upon removal of the stack for causing shifting of the clutch in the opposite direction to again start the carrier means.

2. Apparatus of the character described comprising carrier means including carriers for successively depositing articles upon each other in stack formation, means for driving the carrier means including a clutch having a movable lever, a shift bar connected with the lever having a trigger which is displaceable during the passage thereby of successive carriers during the stacking operation, and means actuated by the last article deposited upon the stack to hold the trigger causing a succeeding carrier to move the bar by engagement with the trigger thereby to shift the lever for the disengagement of the clutch and stopping of the driving means.

3. Apparatus of the character described comprising carrier means including carriers for depositing articles upon each other in stack formation, means for driving the carrier means during the stacking operation including a clutch having a movable lever, a shift bar connected with the lever, a trigger pivoted upon the bar having a heel and being in position for engagement and displacement by the carriers as they pass, and means actuated by the last article deposited upon the stack to hold the heel and prevent displacement of the trigger causing a succeeding carrier to shift the bar by means of the trigger and move the lever for the shifting of the clutch and stopping of the driving means.

4. Apparatus of the character described comprising carrier means including carriers for depositing articles upon each other in stack formation, means for driving the carrier means including a clutch having a movable lever, a shift bar connected with the lever, a trigger pivoted upon the shift bar and being in position for engagement and displacement by carriers in passing by, said trigger having a heel, a cage associated with the shift bar, and means operated by the last article deposited upon the stack for superimposing the cage upon the heel holding the trigger rigid upon the bar and causing a succeeding carrier to shift the bar and move the lever to disengage the clutch.

5. Apparatus of the character described comprising carrier means including carriers for depositing articles upon each other in stack formation each carrier having a roller means for driving the carrier means including a clutch having a movable lever, a shift bar connected with the lever, a trigger pivoted upon the shift bar and having a heel, said trigger extending into the path of the carrier roller and being displaceable by the carriers as the rollers pass by during the stacking operation, a cage riding upon the shift bar, and means having connection with the cage being operated upon the deposit of a last article upon the stack to lower the cage over the heel and prevent displacement of the trigger causing a following roller to lift the shift bar and move the lever to disengage the clutch.

6. Apparatus of the character described comprising carrier means including carriers for depositing articles upon each other in stack formation, each carrier having a roller, means for driving the carrier means including a clutch having a movable lever, a shift bar connected with the lever having a trigger which is engageable and movable by passing rollers, associated means which is operable by the deposit of the last article upon the stack to hold the trigger rigid so that a succeeding roller will lift the bar in one direction and move the lever to disengage the clutch, and holding means with which said associated means is thus brought into engagement suspending the shift bar and holding the lever in the moved position.

7. Apparatus of the character described comprising carrier means including carriers for depositing articles upon each other in stack formation, each carrier having a roller means for driving the carrier means including a clutch having a movable lever, a shift bar connected with the lever having a trigger which is engageable and movable by passing rollers, associated means which is operable by the deposit of the last article upon the stack to hold the trigger rigid so that a succeeding carrier will lift the bar in one direction and move the lever to disengage the clutch, and means set in action upon removal of the stack to release the holding means from said associated means permitting countershifting of the shift bar and lever to reengage the clutch, said trigger moving by the carrier with which it was then engaged.

8. Apparatus of the character described comprising carrier means including carriers for depositing articles upon each other in stack formation, means for driving the carrier means including a clutch having a movable lever, a pedal which is rocked in one direction by the depositing of the articles thereupon during formation of the stack, a shift bar connected with the lever and having a trigger which is displaceable by engagement and passage of the carriers during the stacking operation, a cage associated with the trigger means actuated by the deposit of the last article upon the stack to bring the cage into engagement with the trigger holding it rigid thereby permitting the engaging carrier to shift the bar in one direction and move the lever to disengage the clutch, a hook with which the cage is then engaged holding the shift bar suspended, and means connected with the pedal being operable by reserve movement of the pedal upon removal of the stack causing the disengagement of the hook from the cage permitting the counter-shifting of the shift bar for the purpose described.

9. Apparatus of the character described comprising carrier means including carriers for depositing articles upon each other in stack formation, a pedal which is rocked in one direction by the deposit of the first article of the stack thereupon, a holding bar associated with the pedal having a hook and a shoulder on the hook, means for driving the carrier means including a clutch having a movable lever, a shift bar in connection with the lever having a trigger displaceable by passing carriers, a cage, means actuated by the deposit of the last article upon the stack causing the cage to engage the trigger and permit the following carrier to shift the shift bar and move the lever for disengagement of the clutch said cage and shift bar being then held suspended by the hook, and a lug on the shift bar engaging the shoulder and displacing the hook upon removal of the stack and movement of the pedal in the opposite direction permitting reverse shifting of the shift bar for re-engagement of the clutch.

10. Apparatus of the character described comprising carrier belts, means for applying driving power to move said belts over a defined path, carriers suspended from the belts including end arms having diagonally slotted members, and hooks for supporting an article having studs occupying the slots in which they are rideable when the hooks are temporarily stopped by an obstruction along said path while the remainder of the carrier keeps moving under said driving power thereby to displace the hooks and release the article.

11. Apparatus of the character described comprising carrier belts, a carrier suspended from the belts including end arms and housings having outwardly directed diagonal slots, hooks for supporting an article having shanks received by said housings, and studs on the hooks occupying the slots in which they are rideable upon engagement and temporary stopping of the hooks by an obstruction along the path of movement of the belts and carrier thereby to disengage the article.

12. Apparatus of the character described comprising a pedal upon one end of which articles are to be deposited in stack formation, means providing a fulcrum for the pedal permitting rocking when the first article is deposited and means carried by the pedal receiving said first article and being movable to center the article upon said end of the pedal during rocking.

13. Apparatus of the character described comprising a pivoted pedal upon one end of which articles are to be deposited in stack formation, receivers upon which the first article is deposited, resilient means bearing upon the receivers, and hinges by which the receivers are mounted upon the pedal permitting holding of the receivers in a first adjusted position by virtue of said resilient means and permitting requisite motion to center said first article in respect to the pedal when the weight thereof is imposed upon the receivers.

14. Apparatus of the character described comprising a framework, carrier belts and carriers movable upon the framework said carriers including independently movable hooks for supporting an article during transportation to a point of deposit at one side of the framework, starting and stopping means associated with the carrier belts including a pedal upon which said articles are deposited at said point, connections between said last named means and the pedal performing an initial act in respect to said starting and stopping means, and floor plates situated beside said pedal at said point of deposit providing abutments for said hooks to cause said independent movement thereof for the release of the first article.

15. Apparatus of the character described comprising an article conveyor, a stacking elevator operative at an angle to said conveyor and having a pendent carrier for picking up articles from said conveyor, and idlers over which the elevator is trained, being arranged to direct a part of the elevator in a substantially horizontal path across said conveyor.

16. Apparatus of the character described comprising article-stacking carrier means, driver means for driving the carrier means during stack formation, means actuated by the completed stack to disengage the driver means and stop the carrier means, stack receiving means movable in two directions, one movement occurring by weight of the stack, means to move said receiving means in the other direction upon removal of the stack, and means actuated by the last movement of said receiving means to re-engage the driver means and restart the carrier means.

17. In apparatus of the character described, a movable carrier, a loose hook co-acting therewith, and means connecting the hook and carrier for a rectilinear shift in a diagonal direction upon engaging an obstruction.

18. In apparatus of the character described, an element upon which an article is to be deposited, and a pair of receivers rockably mounted on said element functioning to center the article when engaged by the article prior to coming to rest on the element.

Signed at Exeter, in the county of Tulare and State of California, this 31st day of December, 1927.

ROBERT W. TOMLINSON.